United States Patent
Tonutti

(10) Patent No.: US 6,945,024 B2
(45) Date of Patent: Sep. 20, 2005

(54) INTERNAL OPENING AND CLOSING SYSTEM FOR V-RAKES

(75) Inventor: Carletto Tonutti, Udine (IT)

(73) Assignee: Tonutti S.p.A., Remanzacco (UD) (IT)

( * ) Notice: Subject to any disclaimer, the term of this patent is extended or adjusted under 35 U.S.C. 154(b) by 0 days.

(21) Appl. No.: 10/472,535

(22) PCT Filed: Mar. 28, 2002

(86) PCT No.: PCT/IB02/02157

§ 371 (c)(1),
(2), (4) Date: Sep. 18, 2003

(87) PCT Pub. No.: WO02/078422

PCT Pub. Date: Oct. 10, 2002

(65) Prior Publication Data

US 2004/0083705 A1 May 6, 2004

Related U.S. Application Data

(60) Provisional application No. 60/279,267, filed on Mar. 28, 2001.

(51) Int. Cl.[7] .............................................. A01D 78/14
(52) U.S. Cl. ......................................... 56/377; 56/385
(58) Field of Search .......................... 56/385, 375–377, 56/384

(56) References Cited

U.S. PATENT DOCUMENTS

| | | |
|---|---|---|
| 2,683,345 A | 7/1954 | Meyer |
| 5,062,260 A | 11/1991 | Tonutti |
| 5,598,691 A | 2/1997 | Peeters |
| 5,615,545 A | 4/1997 | Menichetti |
| 5,685,135 A | 11/1997 | Menichetti |
| 5,752,375 A | 5/1998 | Tonutti |
| 5,899,055 A * | 5/1999 | Rowse et al. ................. 56/377 |
| 5,966,916 A * | 10/1999 | Laing .......................... 56/377 |
| 6,314,710 B1 | 11/2001 | Tonutti |
| 6,543,212 B2 * | 4/2003 | Tonutti ....................... 56/375 |

* cited by examiner

Primary Examiner—Meredith C. Petravick
(74) Attorney, Agent, or Firm—Boyle, Fredrickson, Newholm, Stein & Gratz, S.C.

(57) ABSTRACT

A bifold rake includes a rear trolley to which a pair of rake arms are pivotably mounted, and a drawbar extending forwardly from the rear trolley. An opening and closing mechanism includes front and rear operating arms located on each side of the drawbar and pivotably interconnected with each other and with one of the rake arms. The inner end of each operating arm is pivotably interconnected with a slidable arrangement associated with the drawbar, which may be a sleeve slidably mounted to the drawbar for axial movement, or a telescoping section of the drawbar that is capable of moving inwardly and outwardly relative to a receiver section of the drawbar. An extendible and retractable actuator assembly is interconnected with the drawbar and at least one of the slidable arrangements for moving the front and rear arms together and apart to move the rake arms between open and closed positions.

18 Claims, 9 Drawing Sheets

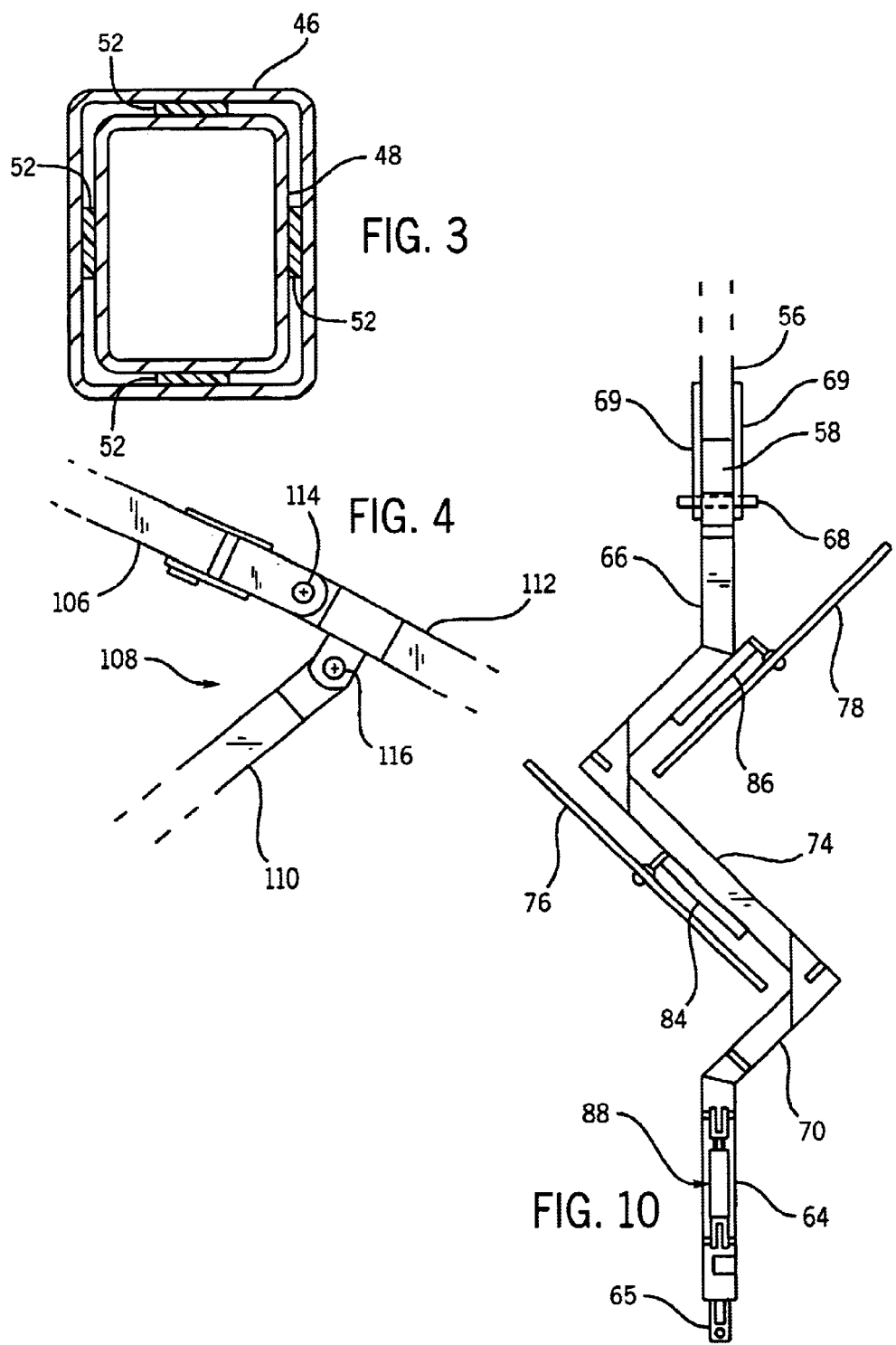

INTERNAL OPENING AND CLOSING SYSTEM FOR V-RAKES

CROSS-REFERENCE TO RELATED APPLICATIONS

This application claims the benefit of U.S. Provisional Application Ser. No. 60/279,267, filed Mar. 28, 2001.

BACKGROUND AND SUMMARY OF THE INVENTION

This invention relates to a bifold or V-type rake for forming cut crop material into a windrow, and more particularly to an internal opening and closing system and a splitter wheel arrangement for use in a rake of this type.

In accordance with one aspect of the invention, a bifold or V-type rake includes a rear wheeled trolley adapted for movement along the ground, and a drawbar that extends forwardly from the rear trolley for connection to a towing vehicle such as a tractor or the like. A pair of rake arms extend forwardly from opposite sides of the trolley, and each rake arm is pivotably interconnected with the trolley for movement between an open, operative position and a closed, inoperative position for transport or storage. Each rake arm may include one or more ground-engaging wheels for supporting the rake arm forwardly of its pivotable interconnection with the trolley. Each rake arm includes a series of rake members, which may be in the form of rotatable finger wheel rakes, each of which is movable between an inoperative, raised position and a lowered, operative position in which the rake members are in engagement with the ground. An opening and closing mechanism is interconnected between the drawbar and each rake arm, for moving the rake arms between their operative, open positions and inoperative, closed positions.

The opening and closing mechanism includes a pair of rear operating arms located one on each side of the drawbar, as well as a pair of front operating arms located one on each side of the drawbar. Each rear operating arm defines an outer end that is pivotably interconnected with an outer end defined by the front operating arm located on the same side of the drawbar. An actuator arm extends outwardly from the pivotable interconnection of each set of front and rear arms, and is engaged at its outer end with the rake arm.

Each of the front and rear operating arms defines an inner end, each of which is pivotably mounted to a slidably movable arrangement that is guided for movement along an axis coincident with or parallel to a longitudinal axis defined by the drawbar. In one form, one or both of the slidably movable arrangements may be in the form of a sleeve or slider member that is slidably mounted to and guided on the drawbar. In another form, one or both of the slidably movable arrangements may be in the form of a telescoping portion of the drawbar. An extendible and retractable actuator assembly is interconnected between the drawbar and one of the slidably movable arrangements, for selectively imparting axial movement to one of the slidably movable arrangements relative to the drawbar. In one form, the rear operating arms are pivotably interconnected with a rear sleeve that is axially movable on a rear portion of the drawbar in response to operation of the extendible and retractable actuator assembly. The front operating arms are pivotably interconnected with a telescoping forward section of the drawbar, which is telescopingly movable from a forward end of the portion of the drawbar to which the extendible and retractable actuator assembly is secured. In this arrangement, retraction of the actuator assembly functions to move the sleeve forwardly on the drawbar, to pivot the rear operating arms outwardly and to cause the front operating arms to be drawn outwardly and the telescoping portion of the drawbar to be moved inwardly. This outward movement of the joint between each rear operating arm and front operating arm is operable to push the rake arm outwardly through the actuator arm, to attain the open position of the rake. Likewise, extension of the actuator assembly moves the sleeve rearwardly on the drawbar, to pivot the rear operating arms inwardly and to cause the front operating arms to be drawn inwardly and the telescoping portion of the drawbar to be moved outwardly. This inward movement of the joint between each rear operating arm and front operating arm causes the actuator arm to draw the associated rake arm inwardly to attain the inoperative, closed position of the rake.

In another embodiment, the telescoping construction of the drawbar is eliminated, and each set of rear and front operating arms is pivotably interconnected with a sleeve or slider member which is guided for movement along an axis coincident with or parallel to the longitudinal axis of the drawbar. This embodiment functions similarly, in that retraction of the actuator assembly moves the rear inner ends of the rear and front operating arms together by movement of the sleeves or slider members toward each other on the drawbar, to move the joints between the rear and front operating arms outwardly to open the rake arms. Conversely, extension of the actuator assembly moves the inner ends of the rear and front operating arms apart by movement of the sleeves away from each other on the drawbar, to draw the joints between the rear and front operating arms inwardly to close the rake arms.

In accordance with another aspect of the invention, a splitter wheel drawbar mechanism is adapted for interconnection with a drawbar for interconnecting a bifold or V-type rake with a tow vehicle such as a tractor. The splitter wheel drawbar mechanism includes a front drawbar section adapted for releasable engagement with the tow vehicle hitch, and a rear drawbar section that extends rearwardly and is interconnected with the trolley of the rake. The splitter wheel drawbar mechanism includes a pair of splitter rake members, such as rake wheels, which are oriented at an angle to each other so as to direct crop material in opposite directions as the rake is moved on the ground. Each rake member is movable between an inoperative, raised position and an operative, lowered position. In a preferred form, the splitter wheel drawbar mechanism includes a series of angularly offset drawbar sections that are interconnected together between the front and rear sections of the splitter wheel drawbar mechanism, and each splitter rake member is supported by one of the angularly offset drawbar sections in a predetermined angular relationship therewith, such that the offset nature of the drawbar sections functions to orient the splitter rake members opposite each other. The splitter wheel drawbar assembly further includes a lifting and lower arrangement for moving the splitter rake members between their inoperative, raised position and operative, lowered position.

While both aspects of the present invention can be incorporated together into a bifold or V-type rake to enhance operation, it is understood that the aspects of the invention may be utilized separately from each other or in combination with other rake features, and that each functions to enhance rake operation on its own.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a section view taken along line 3—3 of FIG. 2;

FIG. 4 is an enlarged partial plan view with reference to line 4—4 of FIG. 2;

FIG. 10 is an enlarged partial top plan view, with reference to line 10—10 of FIG. 6, showing the splitter wheel drawbar mechanism in accordance with the present invention incorporated into the bifold or V-rake;

DETAILED DESCRIPTION OF THE INVENTION

Figure 1:
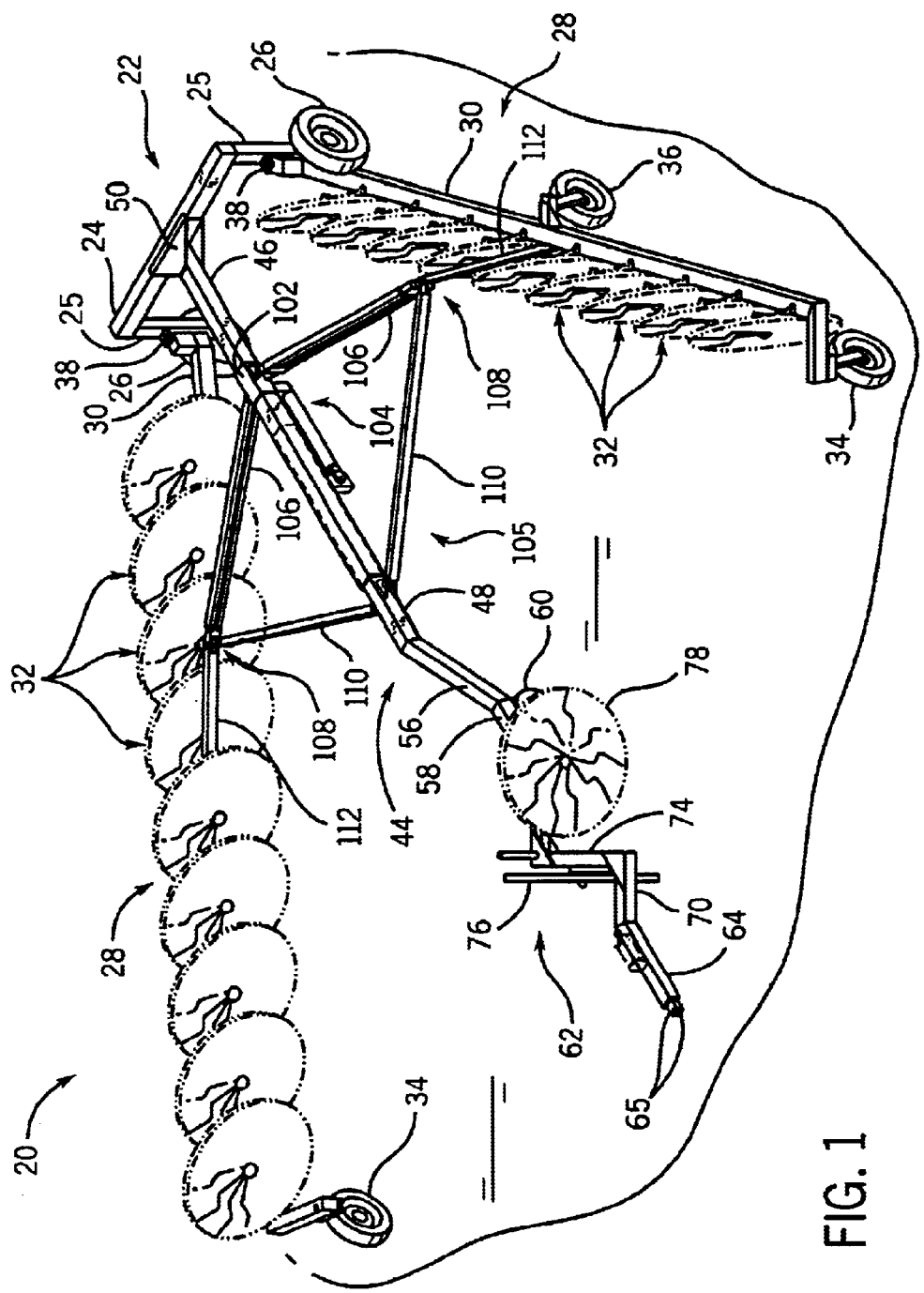
FIG. 1 is an isometric view of a bifold or V-rake incorporating the internal opening and closing mechanism of the present invention, showing the rake arms in an operative, open position.
Figure 2:
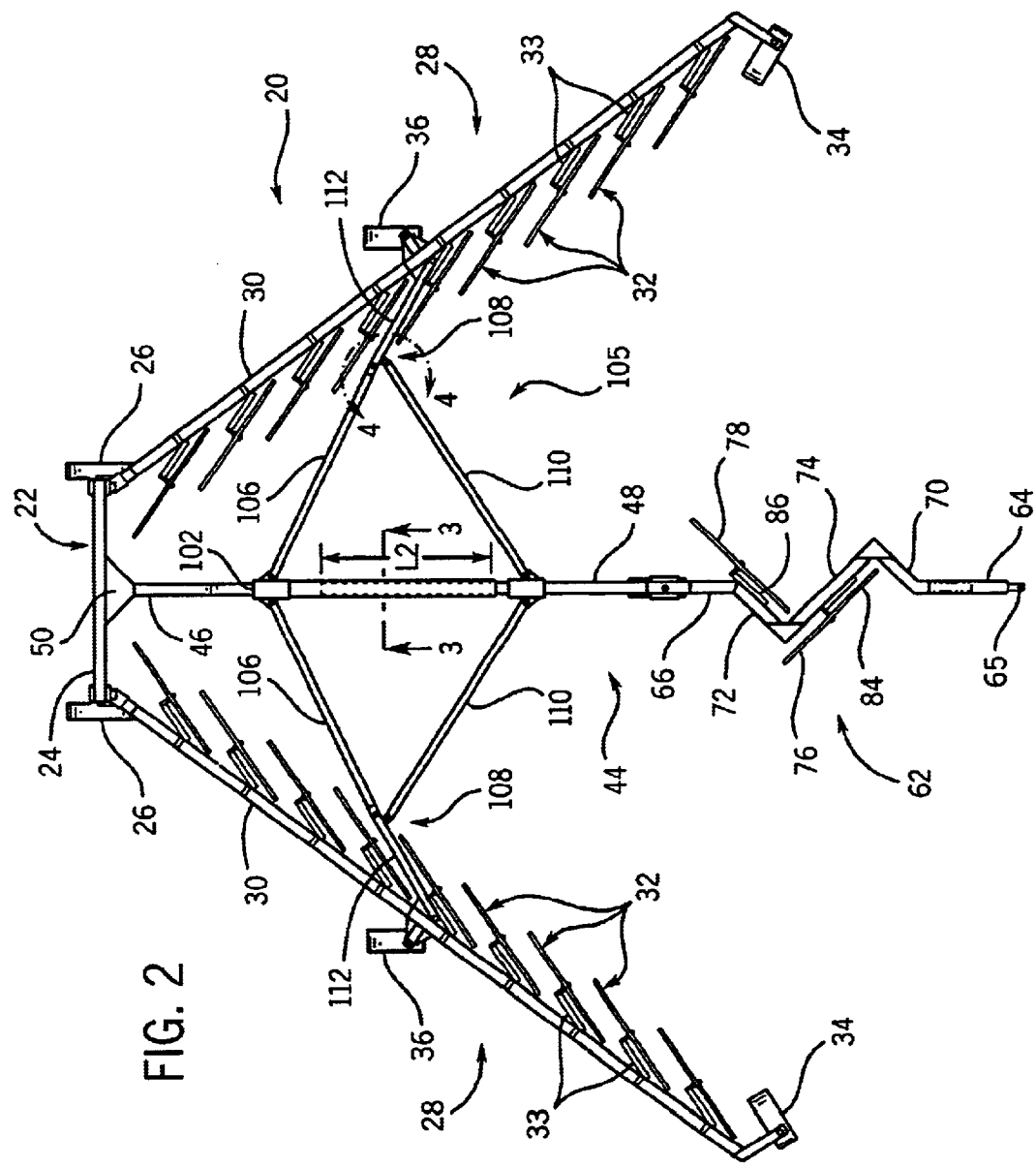
FIG. 2 is a top plan view of the rake of FIG. 1.

Referring to FIGS. 1 and 2, a bifold or V-rake 20 includes a rear trolley or frame assembly 22 having a transverse rear frame member 24 and a pair of wheels 26 rotatably mounted to a pair of depending legs 25, each of which extends downwardly from one of the ends of frame member 24. A pair of rake arm assemblies 28 are pivotably mounted one to each leg 25 of rear frame assembly 22. Each rake arm assembly 28 includes a rake arm 30 to which a series of rake members, in the form of finger wheel rakes 32, are mounted. Finger wheel rakes 32 are mounted to each rake arm 30 via pivot arms 33 in a conventional manner. Each rake arm assembly 28 includes a conventional lifting and lowering mechanism for moving rake wheels 32 between a raised position for transport and a lowered position for engagement with the ground. Each rake arm 30 may have a front wheel 34 at its forward end, as well as an intermediate wheel 36 located approximately midway between the forward and rearward ends of rake arm 30.

In a manner as is known, each rake arm 30 is pivotably mounted to one of legs 25 via a rake arm mounting bracket assembly 38, for providing pivoting movement of each rake arm 30 about a vertical pivot axis between open and closed positions. Each rake arm mounting bracket assembly 38 is mounted to one of legs 25 toward its lower end.

A drawbar assembly 44 extends forwardly from rear frame assembly 22. Drawbar assembly 44 includes a fixed rear section 46 and a sliding or telescoping forward section 48. Rear drawbar section 46 is fixed at its rearward end to a drawbar mounting bracket assembly 50 mounted to rear frame member 24. Rear drawbar section 46 is preferably in the form of an elongated tubular member which may be rectangular in cross-section and which defines an internal passage, although it is understood that any other satisfactory shape or configuration may be employed.

Forward drawbar section 48 is mounted for sliding movement within the internal passage of rear drawbar section 46. Forward drawbar section 48 also is preferably in the form of an elongated tubular member, having a cross-section which enables forward drawbar section 48 to fit within the internal passage of rear drawbar section 46. A series of flat nylon bearings 52 (FIG. 3) are mounted within the internal passage of rear drawbar section 46, and cooperate to slidably engage the external surfaces of forward drawbar section 48, such that forward drawbar section 48 is slidably received within the passage defined by rear drawbar section 46. In this manner, forward drawbar section 48 is slidably movable in a telescoping manner relative to rear drawbar section 46, along coincident longitudinal axes defined by rear and forward draw bar sections 46, 48, respectively.

As shown in FIG. 1, the forward end of forward drawbar section 48 includes a downwardly extending angled member 56 which extends between the front of an upper portion defined by forward drawbar section 48 and the rear end of a lower mounting section 58. A ground wheel 60 is mounted to mounting section 58, for supporting the front end of drawbar assembly 44.

A front splitter wheel drawbar assembly 62 is located forwardly of mounting section 58. Referring to FIGS. 2 and 10, splitter wheel drawbar assembly 62 includes a front section 64 having a pair of hitch engaging plates 65 at its forward end, and a rear section 66 pivotably engaged with mounting section 58 via a transverse pin 68. Rear section 66 is located between a pair of side plates 69, secured to mounting section 58 and extending forwardly therefrom, and pin 68 extends through aligned openings in side plates 69 and a transverse passage associated with rear section 66, such that pin 68 defines a transverse pivot axis between mounting section 58 and splitter wheel drawbar assembly 62. Front section 64 and rear section 66 extend along coincident longitudinal axes, which are coincident with the longitudinal axis of mounting section 58 and parallel to the longitudinal axes of rear and forward drawbar sections 46, 48, respectively.

Between front section 64 and rear section 66, splitter wheel drawbar assembly 62 includes front and rear oppositely angled offset frame members 70, 72, respectively. An angled intermediate frame member 74 extends between the rear end of front offset frame member 70 and the forward end of rear offset frame member 72. Angled intermediate frame member 74 is substantially perpendicular to the longitudinal axes of front and rear offset frame members 70, 72, respectively. A series of triangular gusset plates reinforce the connections of frame members 70–74. With this construction, splitter wheel drawbar assembly 62 defines a "zigzag" configuration when viewed from the top, as shown in FIGS. 2 and 10. A forward splitter rake wheel 76 is mounted to intermediate frame member 74, and a rear splitter rake wheel 78 is mounted to rear offset frame member 72. With this arrangement, forward splitter rake wheel 76 and rear splitter rake wheel 78 are substantially perpendicular to each other, and are symmetrical about the longitudinal axis or centerline of rake 20. Splitter rake wheels 76, 78 clear crop material from the center of the path of rake 20, and direct the crop material in opposite directions into the path of rake members 32 when rake 20 is pulled along the ground.

Figure 11:
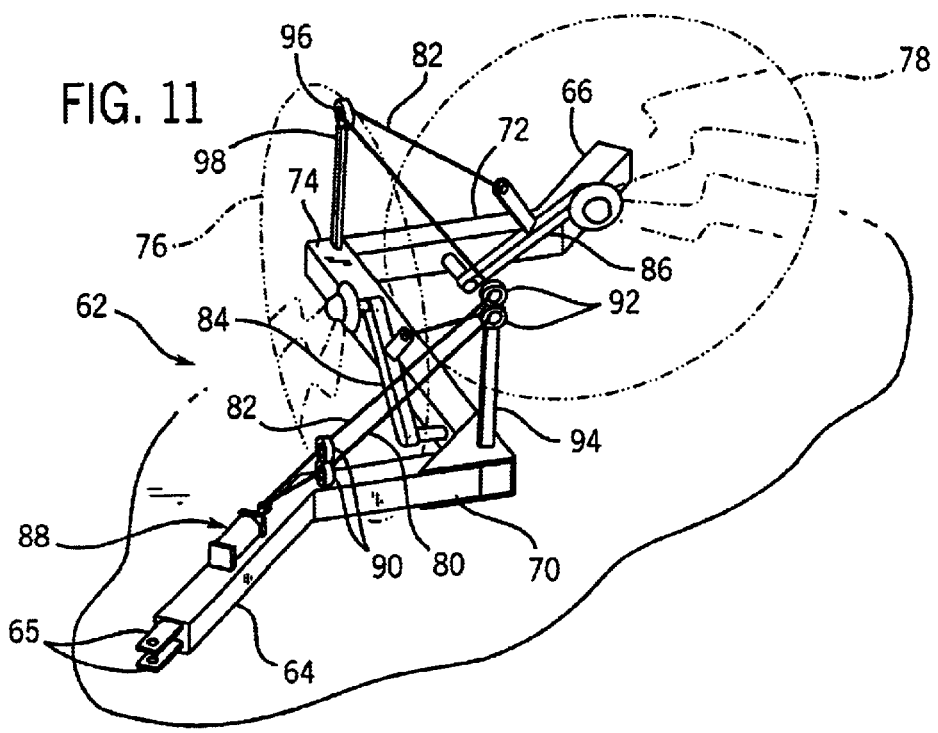
FIG. 11 is a partial isometric view showing the splitter wheel drawbar mechanism of FIG. 10.
Figure 12:
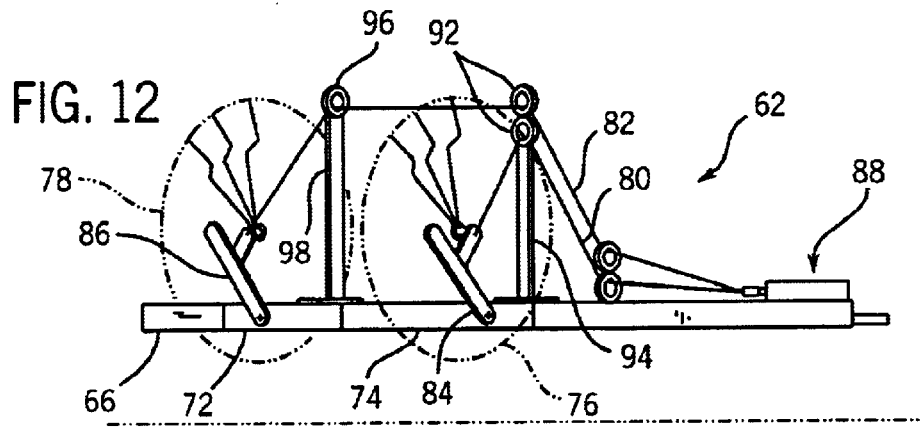
FIG. 12 is a side elevation view of the splitter wheel drawbar mechanism of FIGS. 10 and 11, showing the splitter rake members in an inoperative, raised position.
Figure 13:
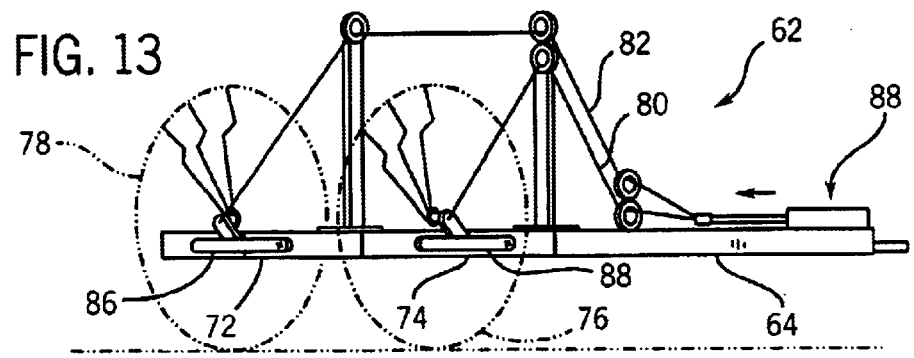
FIG. 13 is a view similar to FIG. 12, showing the splitter rake members in an operative, lowered position.

Splitter rake wheels 76, 78 are pivotably mounted to frame members 74, 76 for movement between raised and lowered positions in a similar manner as rake wheels 32 mounted to rake arms 30. As shown in FIGS. 11–13, a pair of lifting and lowering cables 80, 82 are connected at one end to respective pivotable lifting and lowering arms 84, 86, which are pivotably mounted to front and rear frame members 70, 72, respectively. Forward and rear splitter rake wheels 76, 78, respectively, are rotatably mounted to the outer ends of respective lifting and lowering arms 84, 86. At the opposite end, cables 80, 82 are connected to the extendible and retractable rod of a lifting and lowering cylinder assembly 88 carried by front section 64 of splitter wheel drawbar assembly 62. Cables 80, 82 extend through a lower set of guides 90 mounted to front offset frame member 70, and a pair of elevated guides 92 mounted at the intersection of frame members 70 and 74 via an upstanding bar 94. From the lower one of elevated guides 92, cable 80 extends downwardly for connection to arm 84, and cable 82 extends from the upper one of elevated guides 92 along angled intermediate frame member 74 and through a guide 96 mounted at the intersection of frame members 72 and 74 via an upstanding bar 98. From guide 96, cable 82 extends downwardly for connection to arm 86.

With the above-described arrangement, extension of the rod of cylinder assembly 88 introduces slack into cables 80, 82 to allow splitter rake wheels 76, 78 to be lowered by gravity into an operative position in engagement with the ground, as shown in FIG. 13. Retraction of the rod of cylinder assembly 88 tensions cables 80, 82 and functions to raise splitter rake wheels 76, 78 above the ground to an inoperative transport or storage position as shown in FIG. 12.

Referring to FIGS. 1 and 2, a slider member or sleeve 102 is slidably mounted to rear drawbar section 46 at the rearward end of drawbar assembly 44. Sleeve 102 defines an internal passage within which rear drawbar section 46 is received, and is slidably movable along rear drawbar section 46. A hydraulic opening and closing cylinder assembly 104 has one of its ends fixed to rear drawbar section 46 forwardly of sleeve 102, and has the other of its ends fixed to slider member 102. In this manner, sleeve 102 is movable along rear drawbar section 46 in response to extension and retraction of the rod of cylinder assembly 104.

An opening and closing mechanism 105 is interposed between drawbar assembly 44 and rake arms 30 for moving rake arms 30 between open and closed positions in response to operation of cylinder assembly 104 and movement of sleeve 102. Opening and closing mechanism 105 has a symmetrical, mirror image construction, and includes a pair of rear operating arms 106, a pair of joints 108, a pair of front operating arms 110 and a pair of links or actuator arms 112.

Referring to FIGS. 1, 2 and 4, each rear operating arm 106 has a bifurcated construction and is mounted at its inner, rearward end to slider member 102 for movement about a vertical pivot axis. At its opposite outer, forward end, each rear operating arm 106 is connected to a joint 108 for movement about a vertical pivot axis. Each front operating arm 110 is connected at its outer, rearward end to joint 108 for movement about a vertical pivot axis, and is connected at its inner, forward end to forward drawbar section 48 for movement about a vertical pivot axis. An outwardly extending link or actuator arm 112 extends from each joint 108 and is connected at its outer end to one of rake arms 30 for movement about a vertical pivot axis.

With reference to FIG. 4, each joint 108 is connected to its associated rear arm 106 via a pivot pin 114 that defines a vertical axis pivot connection between the inner end of actuator arm 112 and the outer, forward end of rear arm 106. A pivot pin 116 is connected between the outer, rearward end of each front operating arm 110 and the inner end of its associated actuator arm 112, and defines a vertical axis pivot connection therebetween.

Figure 5:
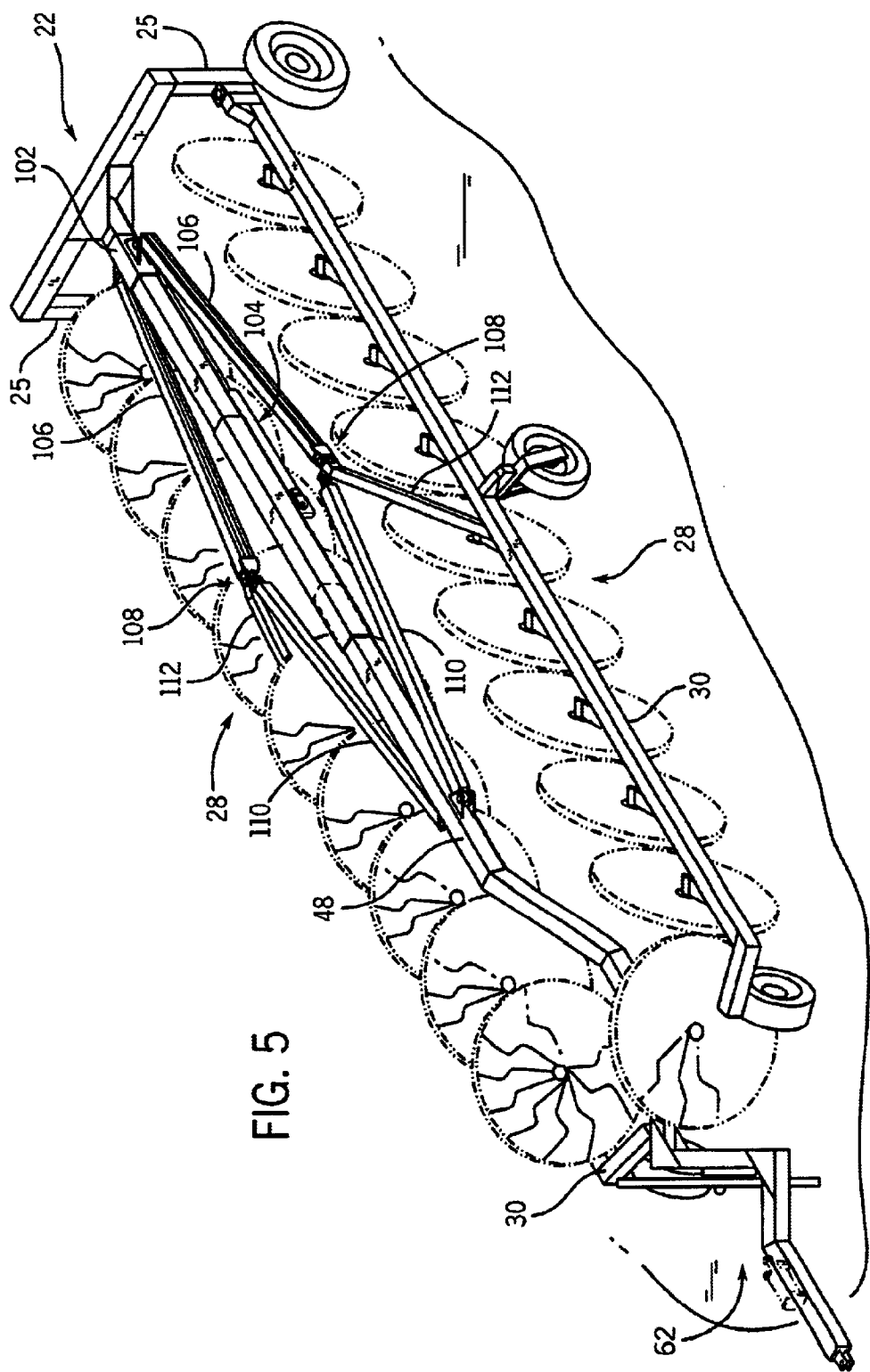
FIG. 5 is a view similar to FIG. 1, showing the rake arms in an inoperative, closed position for transport or storage.
Figure 6:
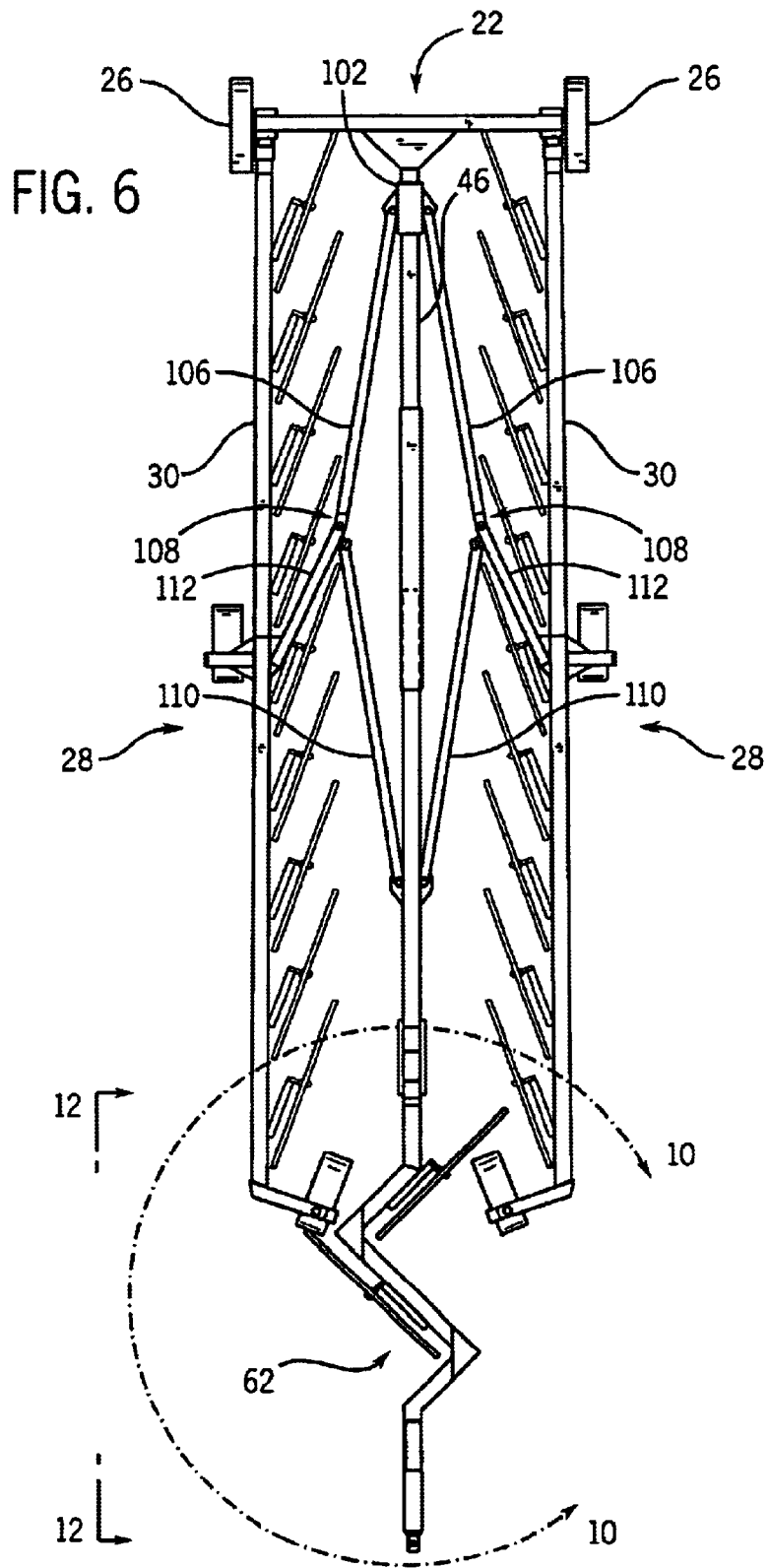
FIG. 6 is a top plan view similar to FIG. 2, showing the rake arms in the inoperative, closed position of FIG. 5.

In operation, rake arms 30 of rake 20 are moved between an open position as shown in FIGS. 1 and 2, and a closed position as shown in FIGS. 5 and 6, as follows. When rake arms 30 are closed for transport as shown in FIGS. 5 and 6, the rod of cylinder assembly 104 is fully extended such that sleeve 102 is located in its rearwardmost position on drawbar assembly 44. In this position of sleeve 102, the outer, forward ends of rear operating arms 106 are positioned inwardly to their fullest extent toward drawbar assembly 44, which likewise places the outer, rearward ends of front operating arms 110 in their inwardmost position toward drawbar assembly 44 and causes maximum outward extension of telescoping front drawbar section 48 relative to fixed rear drawbar section 46. Actuator arms 112 are located in their full inwardmost positions, such that each rake arm 30 extends in a forward-rearward direction substantially parallel to drawbar assembly 44. If desired, a pair of conventional retainer arms may be connected between drawbar assembly 44 and rake arms 30 to maintain rake arms 30 in the closed position during transport. When rake arms 30 are closed in this manner, a minimum amount of overlap, shown at L1 (FIG. 6), is provided between the rearward portion of forward drawbar section 48 and the forward portion of rear drawbar section 46.

To open rake arms 30, the rod of cylinder assembly 104 is retracted so as to draw sleeve 102 forwardly on rear drawbar section 46, which functions to move the inner, rearward end of each rear operating arm 106 forwardly. This functions to increase the angle between each rear arm 106 and drawbar assembly 44, and to move the outer, forward end of each rear operating arm 106 outwardly away from drawbar assembly 44, as shown in FIGS. 1 and 2. Due to the configuration of each joint 108 and the offset relationship between pivot connections 114 and 116, this outward movement of the outer, forward end of each rear operating arm 106 simultaneously functions to draw the outer, rearward end of each front operating arm 110 outwardly, and to exert a rearward force at the pivot connection between forward drawbar section 48 and the inner end of each front operating arm 110. This causes rearward movement of forward drawbar section 48 within rear drawbar section 46, to retract or telescope forward drawbar section 48 into the internal passage defined by rear drawbar section 46. This rearward movement of forward drawbar section 48 enables outward movement of the outer, rearward ends of front operating arms 110. In addition, the outward movement of the outer, forward end of each rear operating arm 106 causes each actuator arm 112 to pivot outwardly due to the configuration of joint 108, such that the combined movement of actuator arms 112 and rear and front operating arms 106, 110, respectively, functions to apply an outward force to each rake arm 30 through actuator arm 112 to pivot each rake arm 30 about the pivot connection of rake arm 30 to bracket assembly 38.

When cylinder assembly 104 is fully retracted so as to place rake arms 30 in their open position, forward drawbar section 48 is retracted into the internal passage of rear drawbar section 46 to attain a maximum amount of overlap as shown at L2 (FIG. 2), which reduces the overall length of drawbar assembly 44. This shortening of drawbar assembly 44 functions to make rake 20 somewhat easier to handle and maneuver when being pulled in a field behind a tractor or the like so as to rake cut crop material.

Figure 7:
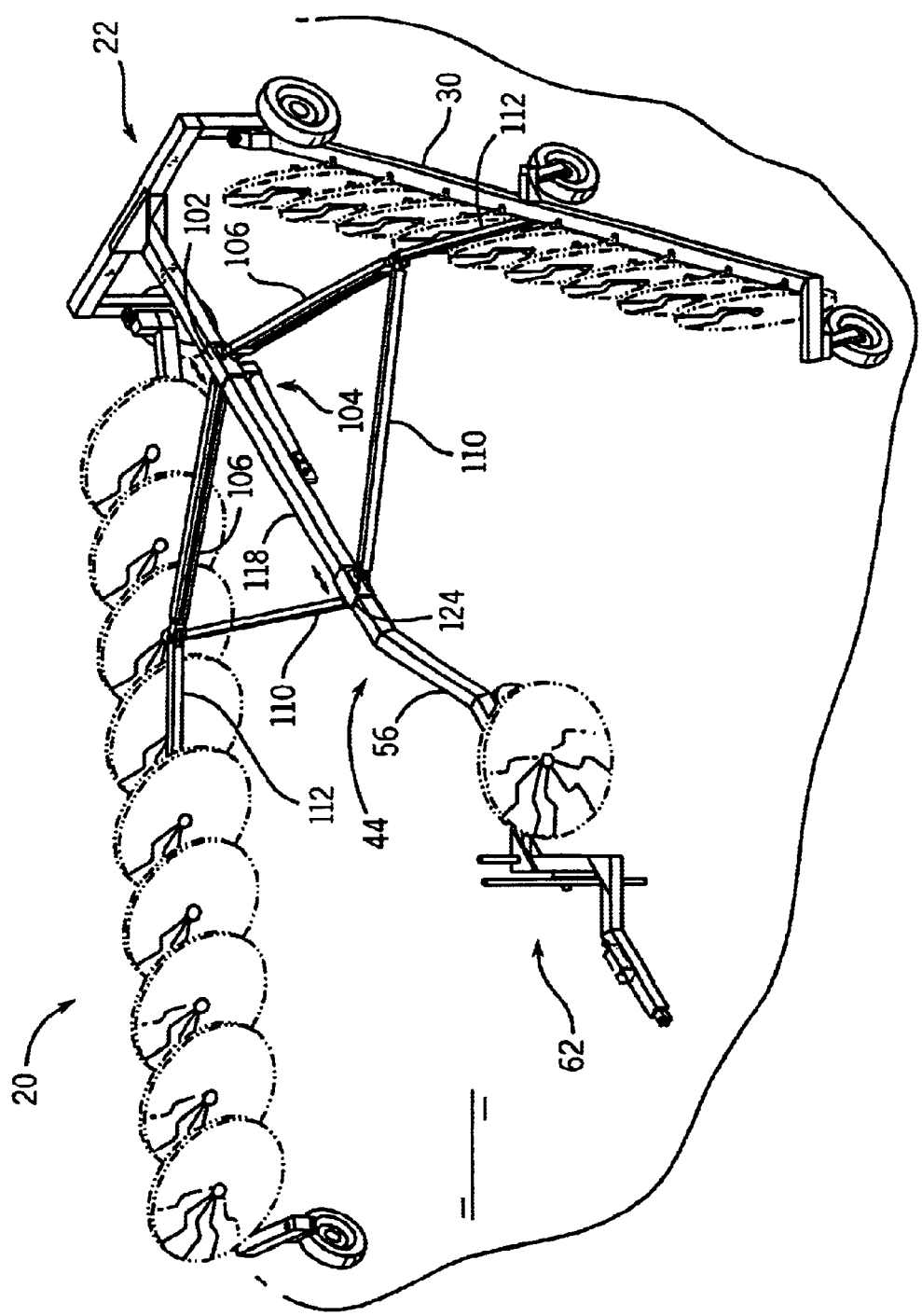
FIG. 7 is an isometric view similar to FIG. 1, showing an alternative embodiment of an opening and closing mechanism for a bifold or V-rake in accordance with the present invention, showing the rake arms in an operative open position.
Figure 8:
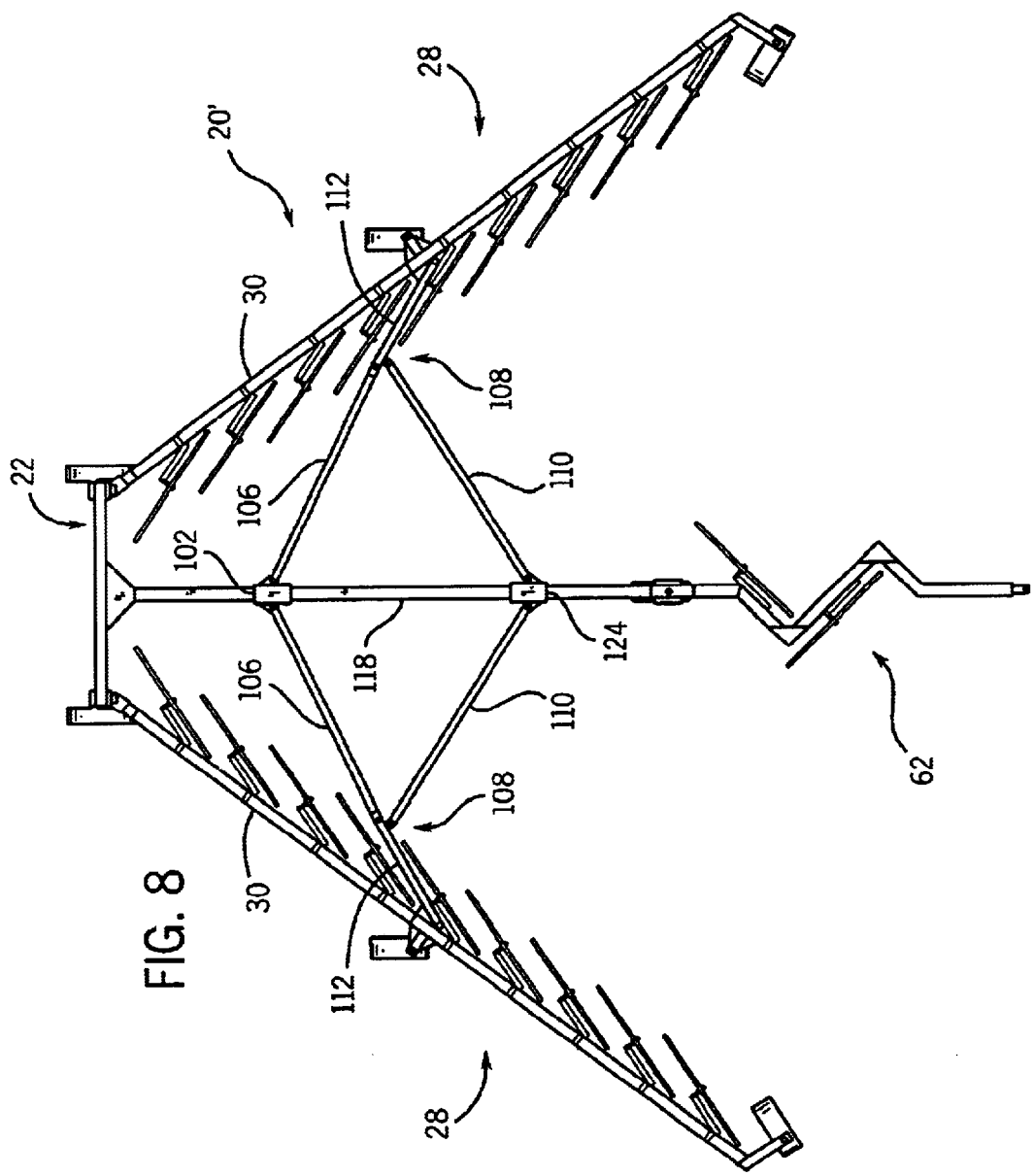
FIG. 8 is a top plan view of the rake of FIG. 7, showing the rake arms in the operative open position.
Figure 9:
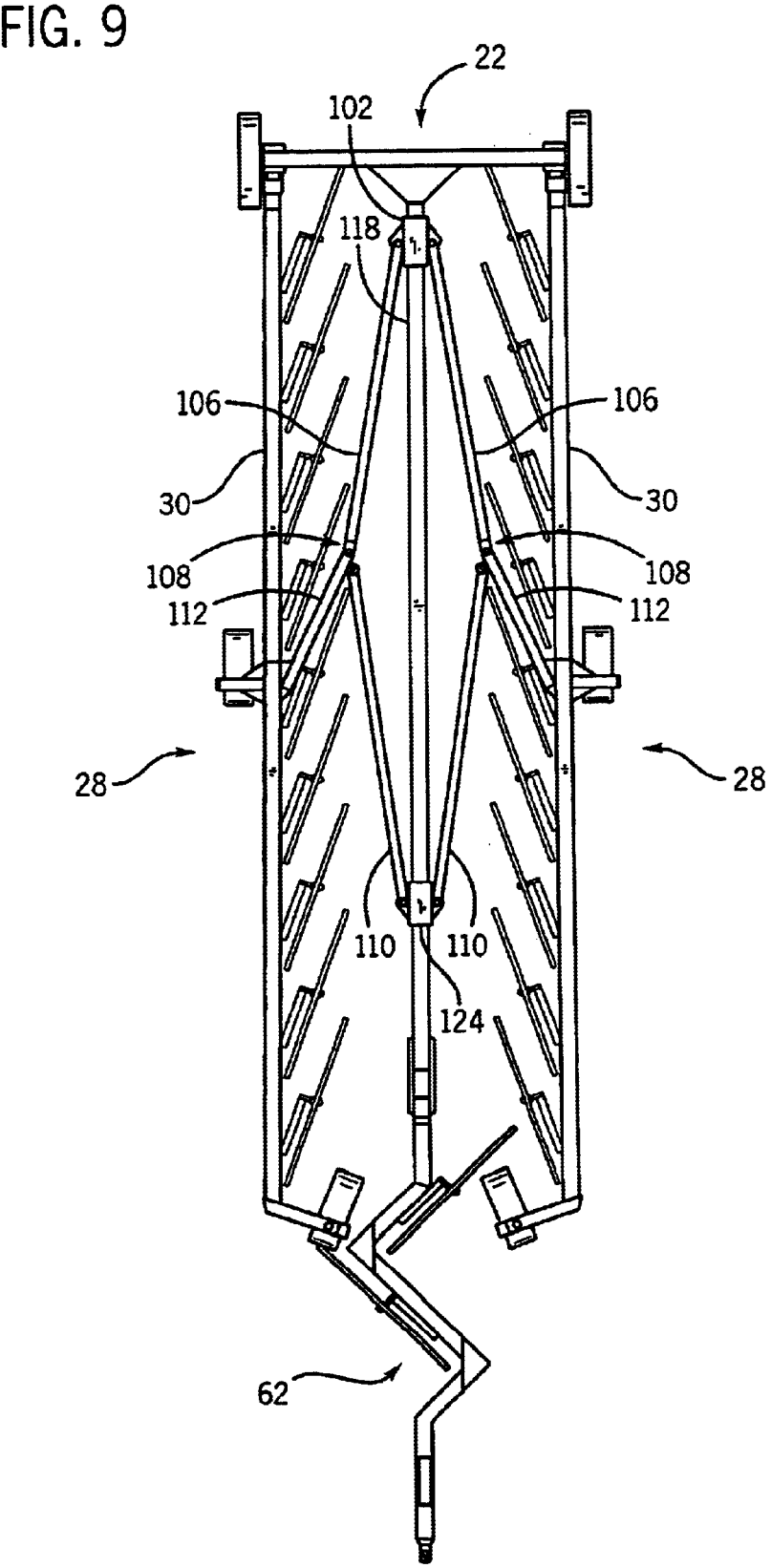
FIG. 9 is a view similar to FIG. 8, showing the rake arms in an inoperative, closed position.

In an alternative construction as shown in FIGS. 7–9 wherein like reference characters are used to denote like parts and primed reference characters are used to denote modified parts, rake 20' includes a drawbar assembly 44' including a primary fixed-length drawbar member 118, which may be in the form of a series of drawbar sections fixed together in an end-to-end relationship so as to define a fixed length. A downwardly angled member 56 extends from the front end of drawbar member 118 for connection to the hitch of the tow vehicle, which may be by means of splitter wheel rake assembly 62. Sleeve 102 is slidably mounted toward the rearward end of drawbar member 118, and rear operating arms 106 are pivotably mounted to rear sleeve 102 in the same manner as discussed previously. At its forward end, each rear operating arm 106 is connected to one of joints 108 as described above, and actuator arms 112 extend outwardly from joints 108. Each actuator arm 112 is pivotably connected at its outer end to one of rake arms 30. Front operating arms 110 extend forwardly from joints 108, and each joint 108 has the same construction as described above. At its forward end, each front operating arm 110 is pivotably connected to a front slider member or sleeve 124 which is slidable relative to drawbar member 118 in the same manner as rear sleeve 102. Actuating cylinder assembly 104 is fixed at one end to drawbar member 118, and at its opposite end is mounted to rear sleeve 102.

With the alternative construction as shown and described, rake 20' is moved from its closed position of FIG. 9, in which rake arms 30 extend substantially parallel to drawbar member 118, to its open position of FIGS. 7 and 8 by retracting the rod of cylinder assembly 104. Such movement of the rod of cylinder assembly 104 draws rear sleeve 102 forwardly on drawbar member 118 to move the outer ends of rear operating arms 106 outwardly and to draw the inner ends of front operating arms 110 rearwardly. In this version, such rearward movement of the inner ends of front operating arms 110 draws front sleeve 120 rearwardly on drawbar member 118. In contrast to the embodiment of FIGS. 1–6, the length of drawbar member 118 in the embodiment of FIGS. 7–9 remains constant and sleeves 102, 124 move toward and away from each other on drawbar member 118. Actuator arms 112 function in the same manner as described above to push rake arms 30 outwardly and to cause pivoting movement about bracket assemblies 38, to place rake 20' in the open position of FIGS. 7 and 8. Subsequent extension of the rod of cylinder assembly 104 moves rear sleeve 102 rearwardly on drawbar member 118, to pull the outer ends of rear operating arms 106 and front operating arms 110 inwardly. This causes forward sliding movement of front sleeve 124 along drawbar member 118, and inward movement of rake arms 30 through actuator arms 112.

While the invention has been shown and described with respect to certain embodiments, numerous variations are possible and are contemplated as being within the scope of the present invention. For example, and without limitation, in the telescoping drawbar version of FIGS. 1–6, it is contemplated that operating cylinder assembly 104 may have one of its ends mounted to the extendible and retractable drawbar section for moving it inwardly and outwardly relative to the fixed drawbar section, rather than to the sleeve or slider member as shown and described. Further, it is contemplated that the sleeve or slider member could be located at the forward end of the drawbar assembly and the telescoping drawbar construction provided at the rearward end, with the extendible rod of the actuator assembly being engaged with either the sleeve or the telescoping drawbar section. It is also possible that the sleeve or slider member could be eliminated and that a dual telescoping drawbar construction could be provided, such that an extendible and retractable drawbar section is located both at the forward end and the rearward end of the drawbar assembly. In this version, both the front and rear operating arms are pivotably mounted to one of the extendible and retractable drawbar sections. This construction provides an even shorter overall length for the drawbar assembly when the operating cylinder assembly is retracted and rake arms 30 are positioned in their operative open position.

In both versions, the operating device for the opening and closing mechanism is described as hydraulic cylinder assembly 104. It should be understood that any other type of movable operating device may be employed, such as a linear actuator, a rodless cylinder assembly, a manual or motor-operated screw-type mechanism, or the like. Further, while the rakes mounted to rake arms 30 are illustrated as finger wheel rakes, it is understood that rake arms 30 may carry any other type of raking devices such as basket-style rakes, tedder-type rakes, etc.

In addition, the configuration of joint 108 is representative of any number of three-way pivoting joint arrangements which could be employed in the opening and closing system of the present invention. Any other types of joint configuration could function with the present invention, so long as the joint configuration provides pivoting movement of the outer ends of rear operating arms 106 relative to front operating arms 110, as well as incorporating the capability to push rakes arms 30 outwardly in response to a decrease in the angle defined between each rear operating arm 106 and its associated front operating arm 110.

It is also understood that the rake arm supporting wheels, such as 34, 36, may be eliminated in rakes having a lesser number of rake wheels in which the rake arms can be cantilevered forwardly from the rake trolley. It is also understood that other types of ground-engaging rake arm supporting arrangements may be employed in place of the ground-engaging wheels such as 34, 36.

Further, while rake 20 has been illustrated as including front splitter wheel drawbar assembly 62, it is understood that rake 20 may be used without splitter wheel drawbar assembly 62 or with a differently configured splitter-type arrangement for moving crop material sideways away from the center of the rake. It is also understood that splitter wheel drawbar assembly 62 may be used in conjunction with a different type of rake than rake 20 having the illustrated details and configurations, and that splitter wheel drawbar assembly 62 may be used in combination with any type of bifold rake having a central drawbar.

Various alternatives and embodiments are contemplated as being within the scope of the following claims particularly pointing out and distinctly claiming the subject matter regarded as the invention.

I claim:

1. A rake assembly adapted to be towed by a tow vehicle, comprising:

a rear trolley arrangement defining opposite sides;

a pair of rake arms, wherein each rake arm carries a series of rake members and wherein each rake arm is pivotably interconnected with one of the sides of the rear trolley arrangement;

a drawbar arrangement extending forwardly from the rear trolley arrangement between the rake arms, wherein the drawbar arrangement is adapted for engagement with the tow vehicle;

an extendible and retractable actuator arrangement interconnected with the drawbar arrangement;

an operating mechanism interposed between the drawbar arrangement and the rake arms, wherein the operating mechanism includes a pair of front operating members and a pair of rear operating members extending outwardly in opposite directions from the drawbar arrangement, wherein each front operating member is pivotably interconnected with one of the rear operating members to define a set of operating members on each side of the drawbar, each of which is interconnected with one of the rake arms, wherein the front operating member and the rear operating member of each set define outer ends that are pivotably connected together at a joint, and further comprising;

an actuator arm extending outwardly from each joint and engaged with one of the rake arms, wherein each actuator arm is pivotably interconnected with one of the front operating members and with one of the rear operating members at the joint therebetween;

a front sliding arrangement associated with the drawbar, wherein each front operating member is pivotably interconnected with the front sliding arrangement; and a rear sliding arrangement associated with the drawbar, wherein each rear operating member is pivotably interconnected with the rear sliding arrangement;

wherein the extendible and retractable actuator arrangement is interconnected with the drawbar and one of the sliding arrangements, wherein the extendible and retractable actuator arrangement is operable to move the front and rear sliding arrangements together and apart for selectively moving the rake arms between their open and closed positions.

2. The rake assembly of claim 1, wherein at least one of the front and rear sliding arrangements comprises a sleeve member slidably engageable with and movable on the drawbar arrangement.

3. The rake assembly of claim 1, wherein at least one of the slidable arrangements comprises a telescoping drawbar section which is axially movable inwardly and outwardly relative to a drawbar receiver section.

4. The rake assembly of claim 3, wherein the other of the slidable arrangements comprises a sleeve member slidably mounted to and movable on the drawbar arrangement.

5. A rake assembly adapted to be towed by a tow vehicle, comprising:

a rear trolley arrangement defining opposite sides;

a pair of rake arms, wherein each rake arm carries a series of rake members and wherein each rake arm is pivotably interconnected with one of the sides of the rear trolley arrangement;

a drawbar arrangement extending forwardly from the rear trolley arrangement between the rake arms, wherein the drawbar arrangement is adapted for engagement with the tow vehicle;

an extendible and retractable actuator arrangement interconnected with the drawbar arrangement;

an operating mechanism interposed between the drawbar arrangement and each rake arm, wherein the operating mechanism includes a pair of front operating members and a pair of rear operating members extending outwardly in opposite directions from the drawbar arrangement, wherein each front operating member is pivotably interconnected with one of the rear operating members to define a set of operating members on each side of the drawbar, each of which is interconnected with one of the rake arms;

a front slidable arrangement associated with the drawbar, wherein each front operating member is pivotably interconnected with the front sliding arrangement; and a rear sliding arrangement associated with the drawbar, wherein each rear operating member is pivotably interconnected with the rear sliding arrangement;

wherein the extendible and retractable actuator arrangement is interconnected with the drawbar and one of the slidable arrangements, wherein the extendible and retractable actuator arrangement is operable to move the front and rear slidable arrangements together and apart for selectively moving the rake arms between their open and closed positions; and wherein at least one of the slidable arrangements comprises a telescoping drawbar section which is axially movable inwardly and outwardly relative to a drawbar receiver section.

6. The rake assembly of claim 5, wherein the other of the slidable arrangements comprises a sleeve member slidably mounted to and movable on the drawbar arrangement.

7. In a rake assembly including a rear trolley, a drawbar extending forwardly from the rear trolley, and a pair of rake arms, each of which is movably interconnected with the trolley on one of a pair of opposite sides defined by the trolley, the improvement comprising:

a pair of rear operating members extending from the drawbar in opposite directions, wherein each rear operating member defines an inner end and an outer end;

a pair of front operating members extending from the drawbar in opposite directions, wherein each front operating member defines an inner end and an outer end;

wherein the outer ends of the front and rear operating members on each side of the drawbar are pivotably interconnected together;

a pair of actuator arms, each of which is engaged with one of the rake arms, wherein each actuator arm is pivotably interconnected on one of the sides of the drawbar with the outer end of one of the rear operating members and with the outer end of one of the front operating members;

a rear slidable engagement arrangement associated with the drawbar, wherein the inner ends of the rear operating members are pivotably interconnected with the rear slidable engagement arrangement;

a front slidable engagement arrangement associated with the drawbar, wherein the inner ends of the front operating members are pivotably interconnected with the front slidable engagement arrangement; and an extendible and retractable actuator arrangement interconnected with the drawbar and with one of the front and rear slidable engagement arrangements, wherein extension of the extendible and retractable actuator arrangement is operable to move the front and rear slidable engagement arrangements apart so as to move the inner ends of the front and rear operating members apart and to move the outer ends of the front and rear operating members inwardly, to place the rake arms in an inoperative closed position, and wherein refraction of the extendible and retractable actuator arrangement is operable to move the front and rear slidable engagement arrangements together so as to move the inner ends of the front and rear operating members together and to move the outer ends of the front and rear operating members outwardly, to place the rake arms in an operative open position.

8. The improvement of claim 7, wherein one of the slidable engagement arrangements comprises a telescoping section of the drawbar that moves inwardly and outwardly relative to a receiver portion of the drawbar, wherein the telescoping section of the drawbar functions to shorten the overall length of the drawbar when the rake arms are in the operative open position.

9. The improvement of claim 8, wherein another of the slidable engagement arrangements comprises a slider member which is slidably mounted to the drawbar.

10. The improvement of claim 9, wherein the telescoping section of the drawbar comprises a forward drawbar portion that extends forwardly from a fixed length receiver portion which in turn is interconnected with the rear trolley arrangement.

11. The improvement of claim 7, wherein each of the front and rear slidable engagement arrangements comprises a sleeve slidably mounted to and movable on the drawbar.

12. In a rake assembly including a rear trolley, a drawbar extending forwardly from the rear trolley, and a pair of rake arms, each of which is movably interconnected with the trolley on one of a pair of opposite sides defined by the trolley, the improvement comprising:

a pair of rear operating members extending from the drawbar in opposite directions, wherein each rear operating member defines an inner end and an outer end;

a pair of front operating members extending from the drawbar in opposite directions, wherein each front operating member defines an inner end and an outer end;

wherein the front and rear operating members on each side of the drawbar are pivotably interconnected together and are engaged with one of the rake arms;

a rear slidable engagement arrangement associated with the drawbar, wherein the inner ends of the rear operating members are pivotably interconnected with the rear slidable engagement arrangement;

a front slidable engagement arrangement associated with the drawbar, wherein the inner ends of the front operating members are pivotably interconnected with the front slidable engagement arrangement; and an extendible and retractable actuator arrangement interconnected with the drawbar and with one of the front and rear slidable engagement arrangements, wherein extension of the extendible and retractable actuator arrangement is operable to move the front and rear slidable engagement arrangements apart so as to move the inner ends of the front and rear operating members apart and to move the outer ends of the front and rear operating members inwardly, to place the rake arms in an inoperative closed position, and wherein retraction of the extendible and retractable actuator arrangement is operable to move the front and rear slidable engagement arrangements together so as to move the inner ends of the front and rear operating members together and to move the outer ends of the front and rear operating members outwardly, to place the rake arms in an operative open position;

wherein one of the slidable engagement arrangements comprises a telescoping section of the drawbar that moves inwardly and outwardly relative to a receiver portion of the drawbar, wherein the telescoping section of the drawbar functions to shorten the overall length of the drawbar when the rake arms are in the operative open position.

13. The improvement of claim 12, wherein another of the slidable engagement arrangements comprises a slider member which is slidably mounted to the drawbar.

14. The improvement of claim 13, wherein the telescoping section of the drawbar comprises a forward drawbar portion that extends forwardly from a fixed length receiver portion which in turn is interconnected with the rear trolley arrangement.

15. In a rake assembly having a wheeled trolley, a pair of rake arms pivotably mounted to the trolley for movement between an open position and a closed position, wherein each rake arm carries a series of rake members, and a drawbar extending forwardly from the trolley between the rake arms, wherein the drawbar extends along a longitudinal axis, the improvement comprising a splitter rake assembly interconnected with the drawbar, wherein the splitter rake assembly includes a frame member extending forwardly from the drawbar, wherein the frame member is interposed between a forward end defined by the drawbar and a tow vehicle adapted to pull the rake assembly, and a pair of splitter rake members mounted to the frame member, wherein the splitter rake members are constructed and arranged to engage the ground and direct crop material on the ground in opposite directions during movement of the rake assembly along the ground, wherein the frame member includes a front splitter rake mounting portion extending at an angle relative to the drawbar longitudinal axis and a rear splitter rake mounting portion extending at an angle relative to the drawbar longitudinal axis and the front splitter rake mounting portion, wherein a splitter rake member is mounted to each of the splitter rake mounting portions of the frame member.

16. The improvement of claim 15, wherein the splitter rake assembly is releasably engageable with the drawbar.

17. The improvement of claim 15, wherein the splitter rake assembly frame member comprises forward and rearward angled offset frame members and an intermediate frame member therebetween, wherein one of the splitter rake members is mounted to the intermediate frame member and another of the splitter rake members is mounted to one of the forward and rearward offset frame members.

18. The improvement of claim 15, wherein the splitter rake assembly frame member includes a front section for connection to the tow vehicle and a rear section for connection to the drawbar, wherein the front and rear sections extend along coincident longitudinal axes that are parallel to the drawbar longitudinal axis, and wherein the front splitter rake mounting portion and the rear splitter rake mounting portion are located between the front and rear sections of the splitter rake assembly frame member.

* * * * *

UNITED STATES PATENT AND TRADEMARK OFFICE
CERTIFICATE OF CORRECTION

PATENT NO. : 6,945,024 B2
DATED : September 20, 2005
INVENTOR(S) : Carletto Tonutti It is certified that error appears in the above-identified patent and that said Letters Patent is hereby corrected as shown below:

Column 11,
Line 4, delete "refraction" and substitute therefore -- retraction --.

Signed and Sealed this

Twenty-ninth Day of November, 2005

JON W. DUDAS
*Director of the United States Patent and Trademark Office*